United States Patent [19]
Kato

[11] Patent Number: 5,921,220
[45] Date of Patent: Jul. 13, 1999

[54] ENGINE FEEDBACK CONTROL

[75] Inventor: Masahiko Kato, Hamamatsu, Japan

[73] Assignee: Sanshin Kogyo Kabushiki Kaisha, Hamamatsu, Japan

[21] Appl. No.: 08/876,957

[22] Filed: Jun. 17, 1997

[30] Foreign Application Priority Data

Jun. 17, 1996 [JP] Japan .................................. 8-155654

[51] Int. Cl.$^6$ .......................... F02D 43/00; F02D 41/14
[52] U.S. Cl. .................... 123/406.45; 123/198 D; 123/406.55; 123/673; 123/689
[58] Field of Search ........................ 123/198 D, 406.45, 123/406.55, 673, 689

[56] References Cited

U.S. PATENT DOCUMENTS

| | | | |
|---|---|---|---|
| 4,182,297 | 1/1980 | Ikenoya et al. | 123/198 D X |
| 4,572,135 | 2/1986 | Nakajima et al. | 123/689 X |
| 5,613,480 | 3/1997 | Katoh et al. | 123/673 |
| 5,615,661 | 4/1997 | Suzuki | 123/688 |
| 5,632,260 | 5/1997 | Kato | 123/673 |
| 5,769,055 | 6/1998 | Motose et al. | 123/198 D X |

*Primary Examiner*—Tony M. Argenbright
*Attorney, Agent, or Firm*—Knobbe, Martens, Olson & Bear LLP

[57] ABSTRACT

An engine feedback control for an internal combustion engine having at least two combustion chambers is disclosed. When a sensor detects a high engine temperature condition of the engine, the feedback control changes the air/fuel ratio of the air and fuel supplied to each combustion chamber in a manner which prevents operation of any combustion chamber in a disabling range.

15 Claims, 11 Drawing Sheets

ENGINE FEEDBACK CONTROL

FIELD OF THE INVENTION

The present invention relates to an engine feed back control. More particularly, the invention is a feedback control which controls adjusts the air/fuel ratio of the charge supplied to the engine when a high engine temperature is detected in a manner which prevents operation of any of the cylinders in a disabling range.

BACKGROUND OF THE INVENTION

In order to optimize engine performance and reduce undesirable emissions, it is now common to employ an engine control to control various aspects of an internal combustion engine. One method for controlling an engine is to provide an engine control unit with data regarding at least one operation condition of the engine, the control unit utilizing the data to provide an output signal to one or more engine controls.

For example, an oxygen sensor may be employed in the exhaust system of the engine for monitoring the air to fuel ratio. In the event the air to fuel ratio is indicated as too rich (i.e. to much fuel is being supplied in relation to the air), the engine control causes a fuel supply system of the engine to supply less fuel to the engine. In this arrangement, the engine control typically utilizes feedback from the single sensor corresponding to the cylinder which is hottest to make the same adjustment in the air to fuel ratio of the charge supplied to all of the cylinders of the engine.

Figure 5:
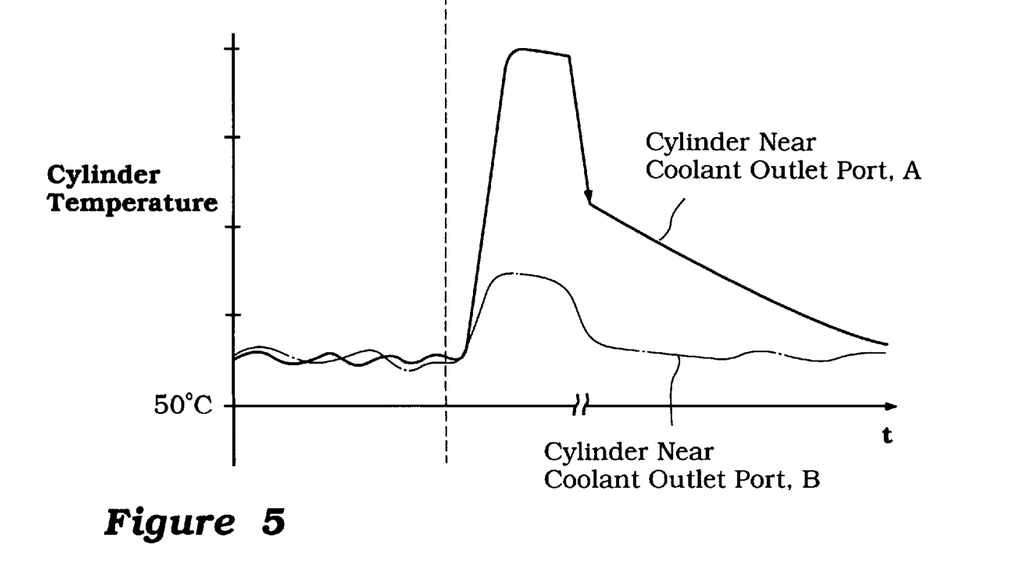
FIG. 5 is a graph illustrating the temperature of a cylinder near a coolant entrance versus a temperature of a cylinder near a coolant exit for an engine operated in accordance with the speeds illustrated in FIG. 3.

Several problems have been encountered with this type of engine control. For example, most engines utilize a liquid cooling system which directs coolant along a coolant path through the engine for cooling each cylinder. In this system, the coolant is relatively cool along the beginning of the coolant path near one cylinder, and gets increasingly warm along its path to the end near another cylinder. The first cylinder is thus more effectively cooled than the last cylinder (see FIG. 5).

Figure 6A:
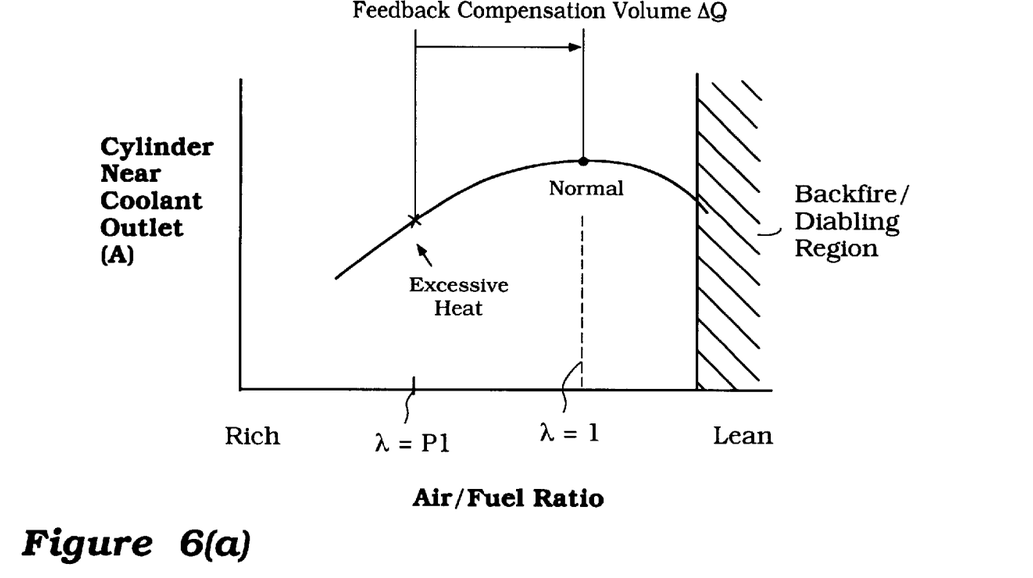
FIG. 6(a) is a graph illustrating an engine control adjustment to the air to fuel ratio of a hot cylinder in accordance with an engine control of the prior art when a high engine temperature is detected.
Figure 6B:
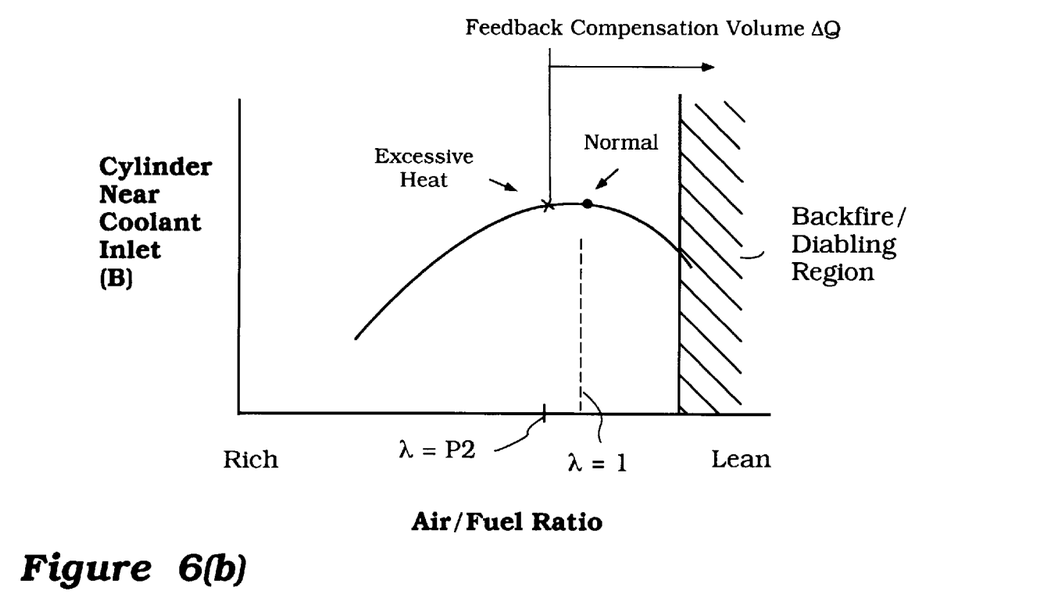
FIG. 6(b) is a graph illustrating an engine feedback control adjustment to the air to fuel ratio of a cool cylinder in accordance with an engine control of the prior art when a high engine temperature is detected.

When fuel is supplied to each of these cylinders, the fuel supplied to the hotter cylinder is more effectively vaporized and less air may enter the cylinder, causing the air to fuel ratio of the charge which is actually delivered to the engine to appear much richer than that of the cooler cylinders. This may occur because data supplied to the engine control indicates that one amount of air is being supplied to the cylinders (such as by a throttle position sensor), but unequal amounts of air actually enter the cylinders because of differences in temperature. When the engine control obtains sensor information indicating that the air and fuel mixture supplied to the hot cylinder is too rich, the engine control sets about reducing the amount of fuel supplied to the cylinders to bring the air to fuel ratio back into the desired range. When this compensation is made (i.e. lessening the amount of fuel supplied to the cylinder by an amount $\Delta Q$) the desired air to fuel ratio is achieved in the hotter cylinder (see FIG. 6(a)). On the other hand, the cooler cylinder(s) already have a leaner air and fuel mixture. The further reduction in fuel amount by the engine control may cause the air and fuel mixture to be too lean, resulting in possible backfiring, stalling or the like (see FIG. 6(b)).

This high engine heat problem may also be experienced when the engine moves from a high speed and/or high load condition to a low load condition. In many engines, the flow rate of coolant through the engine is dependent upon the speed a coolant pump is driven. When an engine is running at high speed, the pump is effective in providing coolant to the engine. If the operator then causes the engine to move to an idle state, the engine remains very hot, but the flow rate of coolant diminishes. The cylinder(s) near the coolant entrance are then cooled much more effectively than those near the end of the coolant flow path (see FIG. 3).

It is, therefore, an object of the present invention to provide an engine control for controlling a combustion condition parameter, such as an air/fuel ratio, when the engine is hot and which overcomes the above-stated problems.

SUMMARY OF THE INVENTION

In accordance with the present invention, there is provided an engine feedback control which, upon detection of a high engine temperature adjusts the ratio of air and fuel supplied to each combustion chamber of the engine in a manner which prevents any combustion chamber from operating in a disabling mode or range.

Preferably, the engine has at least two combustion chambers each having an intake for providing air to the combustion chamber, a fuel delivery system for providing fuel to the combustion chamber and an exhaust passage leading from said combustion chamber for routing exhaust gasses therefrom. The engine also preferably includes a cooling system which cools one combustion chamber more effectively than another, such that one combustion chamber is generally hotter than another.

The engine feedback control comprises means for detecting a high engine temperature. Preferably, this means comprises at least one temperature sensor. In addition, the feedback control preferably includes at least one sensor for detecting an air/fuel ratio.

In the event a high engine temperature is detected, the feedback control detects the air/fuel ratio and adjusts the ratio of air and fuel to a desired value if it is not already at the desired value. Preferably, the feedback control includes means for adjusting the ratio of air to fuel in a manner which prevents any combustion chamber from operating in a disabling mode.

In one embodiment, the means for adjusting adjusts the air/fuel ratio corresponding to each combustion chamber independently.

In another embodiment, the same adjustment to the air/fuel ratio is made corresponding to all combustion chambers, with the adjustment small enough to prevent any combustion chamber from operating in the disabling mode.

In another embodiment, the adjustment made to the ratio corresponding to some combustion chambers is different than others, such as by making a smaller adjustment in the ratio to a combustion chamber which is cooler than one which is hot.

In another embodiment, an adjustment to the air to fuel ratio is made corresponding to all combustion chambers, and the spark ignition timing is changed with respect to at least one combustion chamber for preventing its operation in the disabling mode.

In yet another embodiment, an adjustment is made to the desired air to fuel ratio before making an adjustment to the actual air to fuel ratio of the charge supplied to each combustion chamber.

Further objects, features, and advantages of the present invention over the prior art will become apparent from the detailed description of the drawings which follows, when considered with the attached figures.

DETAILED DESCRIPTION OF THE PREFERRED EMBODIMENTS OF THE INVENTION

The present invention is an engine feed back control. In general, the engine feed back control is adapted to control a combustion condition parameter of an engine. Preferably, the feed back control controls the air to fuel ratio of the charge supplied to each cylinder when a high engine temperature is indicated.

The engine control of this invention is particularly suited to use with an engine which powers a water propulsion device of an outboard motor propelling a watercraft, since this is an engine operating environment in which the problems with controlling the air to fuel ratio when the engine becomes hot is frequently encountered. It should be understood, however, that the engine control may be utilized with an engine utilized in any of a wide range of other applications.

Figure 1:
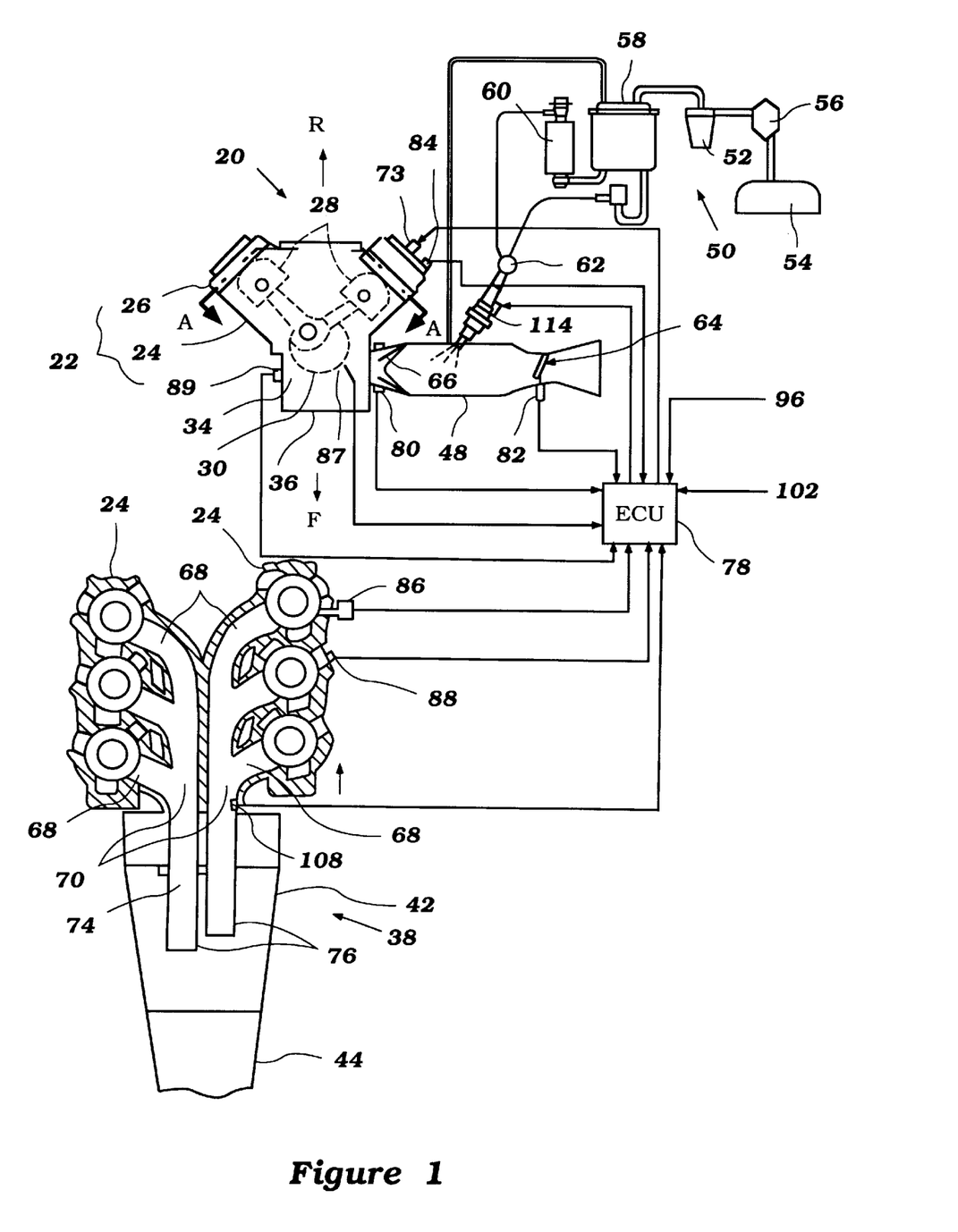
FIG. 1 illustrates in schematic form the engine control of the present invention as it relates to a two-cycle engine powering an outboard motor for use in propelling a watercraft, illustrating a fuel system, the engine in plan end view and in cross-sectional along line A—A of the plan view.
Figure 2:
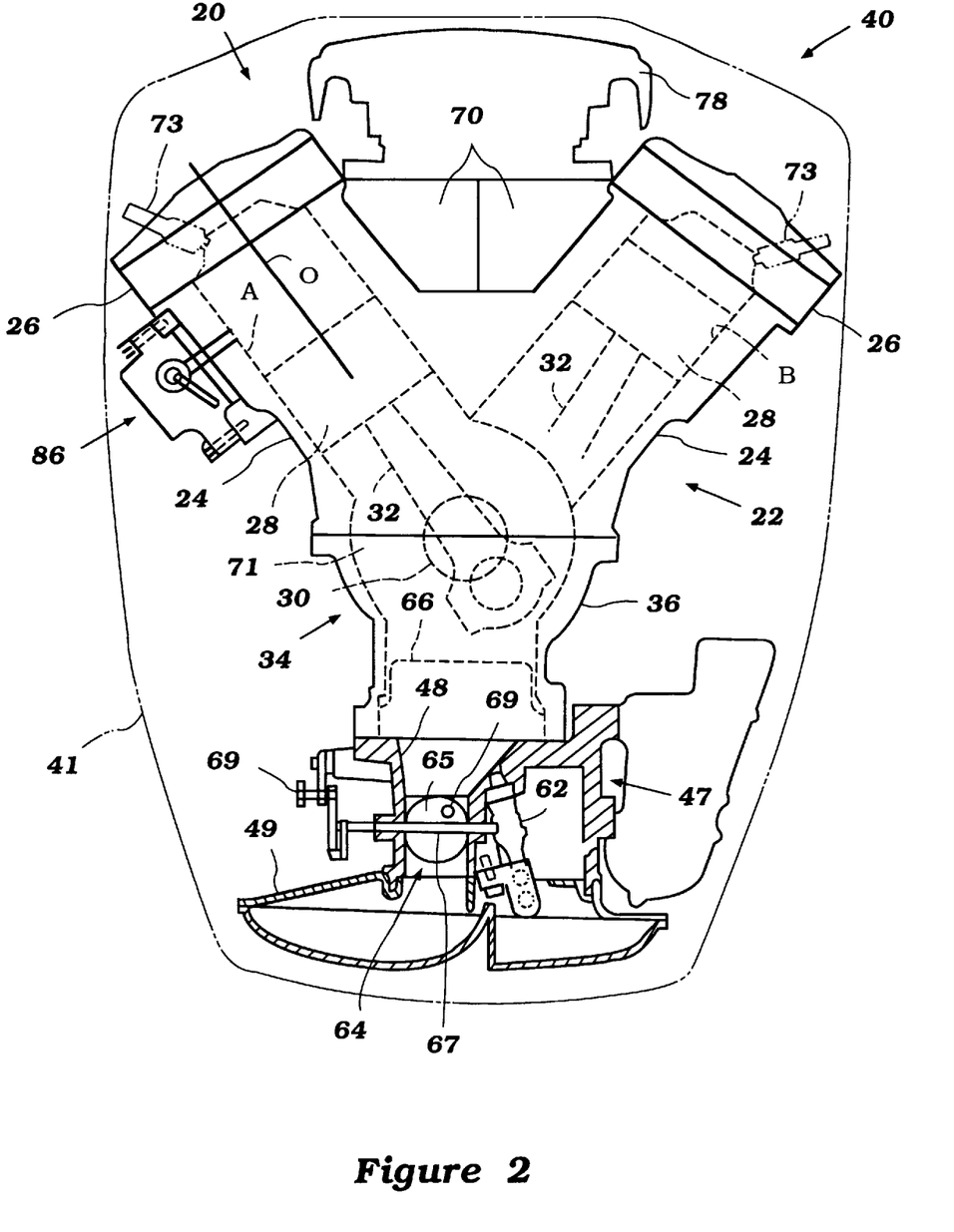
FIG. 2 is a cross-sectional top view of a motor powered by the engine illustrated in FIG. 1 and controlled with the engine feed back control of the present invention.

Referring to FIGS. 1 and 2, the engine control is adapted for use with an internal combustion engine 20 operating on a two-cycle principle. The engine 20 illustrated is of the "V" type. This engine 20 has a body 22 comprising a cylinder block 24 having a pair of cylinder heads 26 connected thereto. The cylinder block and heads 24,26 define a pair of cylinder banks. The cylinder block and head 24,26 comprising each bank defines three cylinders therein.

A piston 28 is movably mounted within each cylinder and cooperates with the cylinder block 24 and its respective head 26 to define a combustion chamber. Each piston 28 is connected to a crankshaft 30 with a connecting rod 32. The crankshaft 30 is mounted for rotation with respect to the cylinder block 24 in a crankcase 34 thereof. The crankcase 34 is positioned opposite the cylinder heads 26 and defined by a cover 36 attached to the cylinder block 24.

It should be understood that the engine 20 may be configured in many other ways than that described above. For example, the engine 20 may have as few as one cylinder per bank, or more than three. In addition, the engine 20 may be arranged in other than "V" fashion.

Preferably, the engine 20 is utilized to power a water propulsion device, such as a propeller, of an outboard motor 40. The motor 38 preferably includes a cowling 41 in which the engine 20 is positioned, and a lower unit positioned below the cowling 41, the lower unit comprising a drive shaft housing 42 and a lower portion 44. The motor 40 is preferably movably positioned to a watercraft (not shown) via a mounting 46. Such mountings are well known in the art.

An intake system is provided for supplying each combustion chamber of the engine 20 with an air and fuel mixture for combustion. In this embodiment, an intake passage 48 leads through a throttle body 47 to the crankcase 34 of the engine 22. The intake passage 48 has one end which is open and through which air is drawn. Preferably, the open end of the passage 48 is positioned in an air box 49, through which air is drawn from within the cowling 41.

A fuel system 50 provides fuel into the air passing through the intake passage 48. The fuel system may have any of a variety of configurations as well known in the art. In the embodiment illustrated, a low pressure pump 52 draws fuel from a supply 54 through a fuel filter 56 and delivers it into a vapor separator 58. A high pressure pump 60 then draws fuel from the vapor separator 58 and delivers it under high pressure though a fuel passage to a fuel injector 62. The fuel injector 62 is arranged to deliver fuel into the air passing through the intake passage 48.

A throttle 64 is provided in the intake passage 48 for controlling the flow rate of air therethrough. The throttle 64 preferably comprises a butterfly type plate 65 mounted to a shaft 67 in the intake passage 48, and remotely operable by the operator of the watercraft by a throttle control linkage 69.

Preferably, an idle speed control 69, in the form of a throttled bypass passage in the throttle plate 65, is provided for allowing air to bypass the throttle plate 65 when it is closed, and yet the engine is running and requires air. This situation arises, for example, then the engine is idling.

The air and fuel mixture passes through a reed valve 66 and into a crankcase chamber corresponding to one of the cylinders. As is well known, the crankcase 34 is divided into individual chambers 71, one corresponding to each cylinder.

The air and fuel charge is compressed in the crankcase chamber and then drawn through a passage (not shown) into the combustion chamber of that cylinder, where it is ignited with a spark plug 73 or similar device. Upon ignition, the piston 28 is forced downwardly and effectuates a rotation of the crankshaft 30.

In this arrangement, an intake passage 48 and fuel injector 62 is provided corresponding to each cylinder of the engine 20.

Exhaust gasses from the combustion process are routed from each cylinder through an exhaust port 68. Each exhaust port 68 leads to a common exhaust collection passage 70. This passage 70 may be defined by an exhaust manifold connected to the engine 20 and having branches extending to the passage leading through the engine 20 from each cylinder.

As is common in outboard motor 40 practice, the engine 20 is positioned above an exhaust guide 72. Each common passage 70 extends to a corresponding passage 74 through the exhaust guide 72, and thereon to an exhaust pipe 76 extending into a chamber or muffler 76 in the lower unit of the motor 40. The exhaust is then discharged through a below water hub discharge or an above the water or similar discharge, as is well known in the art.

Although not illustrated, a cooling system is preferably provided for cooling the engine 20. In the situation where the engine 20 powers an outboard motor, the cooling system preferably draws water from the body of water in which the motor is operating and delivers it through one or more coolant passages through the engine 20, such as coolant jackets corresponding to the cylinders, and then expels the coolant back to the body of water. In this arrangement, the water is preferably pumped by a pump driven off of the a drive shaft which is driven by the crankshaft 30 of the engine 20 and which also drives the water propulsion device of the motor. Generally, the coolant path is such that the coolant enters the coolant jackets near one cylinder "B" and exits the engine from a coolant jacket near another cylinder "A." The cylinder "A" is less effectively cooled than cylinder "B" because of the heating of the coolant as it flows along the coolant path through the engine from the jacket corresponding to cylinder "B" to the jacket corresponding to cylinder "A."

In accordance with the present invention, an engine control is provided for controlling one or more aspects of the engine 20. Preferably, this engine control includes an electronic engine control unit or ECU 78. This ECU 78 preferably includes a memory or map of engine control strategies, which, when appropriate engine condition data is supplied thereto, generates instructions for controlling the engine 20.

A variety of data is supplied to the ECU 78 by one or more sensors. As illustrated, a temperature sensor 80 is preferably provided along the intake passage 48 for providing data regarding the temperature of the incoming air. A throttle opening sensor 82 provides data regarding the position of the throttle 64 as controlled by the operator.

An air pressure sensor 84 mounted in one of the cylinders provides data regarding the pressure inside the cylinder of the engine 20. An oxygen sensor 86 is positioned to monitor the oxygen content of the exhaust and provides this data to the ECU 78. A temperature sensor 88 provides data regarding the temperature of the engine 20. A crank angle sensor 87 provided data regarding the position of the crankshaft 30, and thus the pistons 28. A crankcase pressure sensor 89 provides data regarding the pressure of the air and fuel charge within at least one of the crankcase chambers of the engine 20.

Data such as the atmospheric air pressure 96 and incoming coolant temperature 102 are also provided to the ECU 78. A back pressure sensor 108 is preferably positioned along at least one of the common or collection exhaust passages 70. This sensor 108 provides the ECU 78 with data regarding the actual pressure of the exhaust within the exhaust system.

In accordance with the present invention, means are provided for monitoring at least one operating parameter of the engine 20 and controlling the engine 20 in accordance with changes in the operating parameter. Preferably, this means comprises an engine feedback control which includes the ECU 78, the ECU 78 receiving operating condition data and then adjusts at least one engine operating parameter based on this detected operating parameter, as described in more detail below.

Figure 7A:
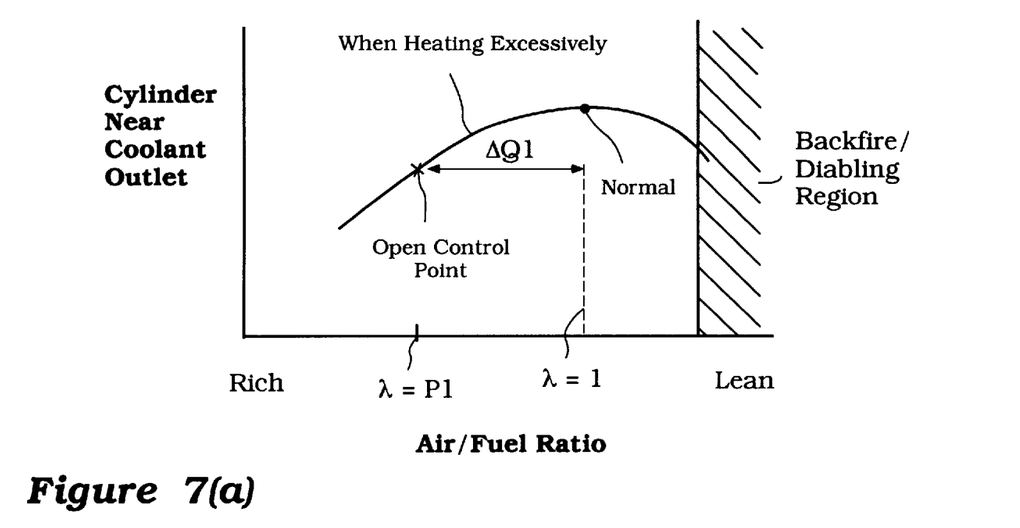
FIG. 7(a) is a graph illustrating an engine feedback control for a hot cylinder in accordance with a first embodiment of the present invention.
Figure 7B:
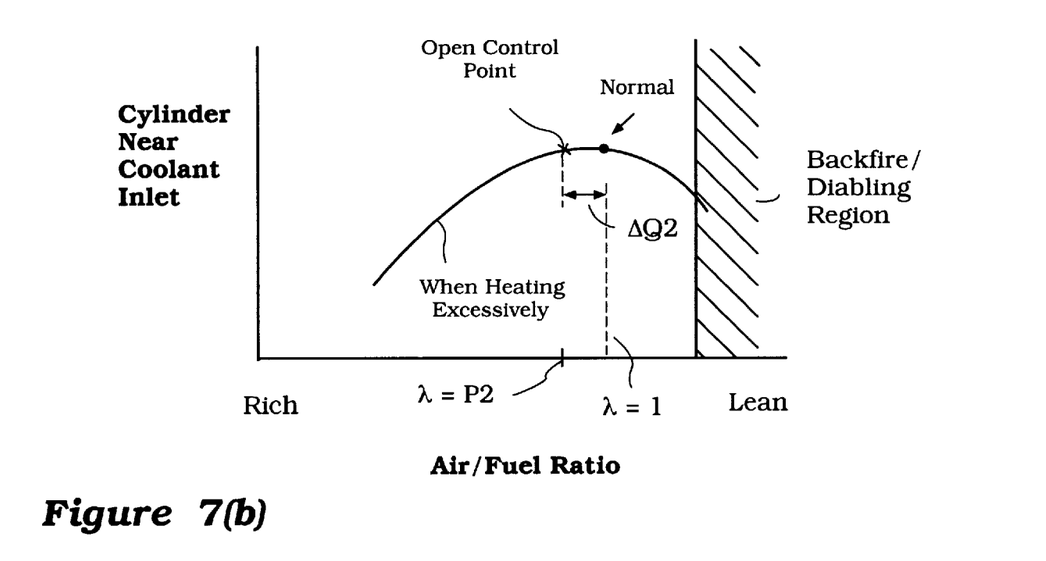
FIG. 7(b) is a graph illustrating an engine feedback control for a cool cylinder in accordance with a second embodiment of the present invention.

In a first embodiment engine feedback control of the present invention, a feedback control strategy is employed in which the air to fuel ratio of the mixture supplied to each cylinder is independent. As illustrated in FIGS. 7(a) and 7(b), the when a high engine temperature or "excessive heating condition" is detected (such as with the temperature sensor 88) then the ECU 78 controls the invention in the follow manner. The air to fuel ratio of the charge supplied to the hotter cylinder(s) is adjusted (made leaner) by an amount ΔQ1 to cause the air to fuel ratio to move from the actual too rich state to the desired state. On the other hand, the ECU 78 causes the air to fuel ratio of the charge supplied to the cooler cylinder(s) to become leaner by an amount ΔQ2, which reduction is less than the amount ΔQ1. In this manner, the mixture supplied to the cooler cylinders is not made so lean as to cause the cylinder to operate in a disabling range (i.e. that where backfire, stalling or the like is likely).

In this first embodiment, the feed back control thus operates in an open or non-feedback control mode with the mixture supplied to each cylinder being independently corrected. Preferably, the correction to the air to fuel ratio is made with a signal to the fuel injector 62 which causes less fuel to be delivered (such as by shortening the fuel injection time).

Figure 8A:
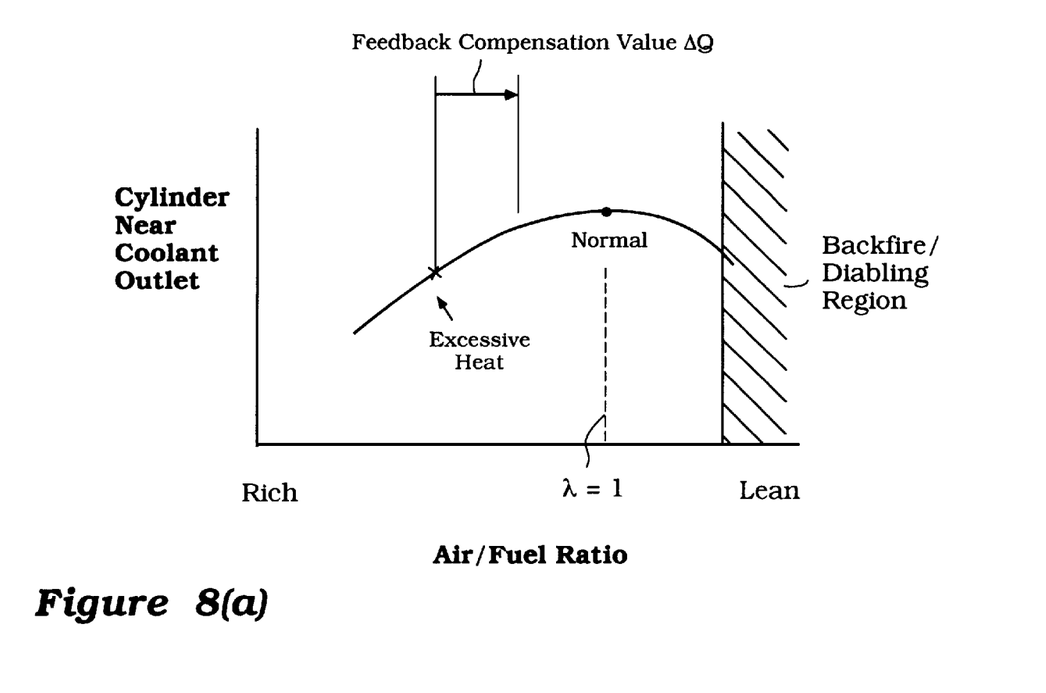
FIG. 8(a) is a graph illustrating an engine feedback control for a hot cylinder in accordance with a second embodiment of the present invention.
Figure 8B:
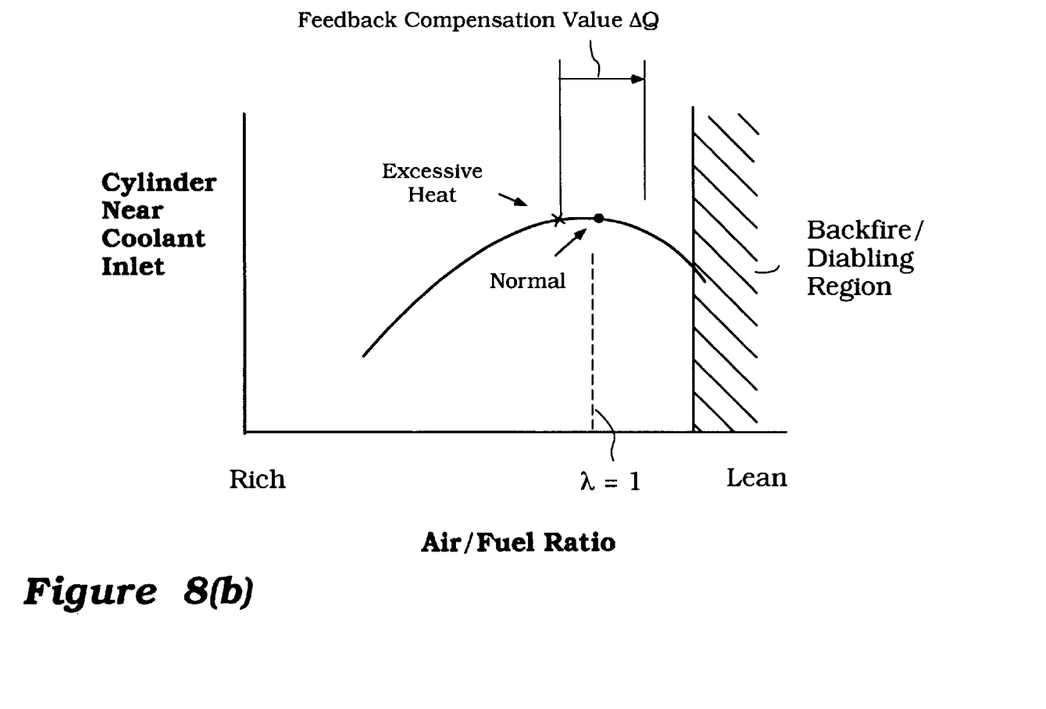
FIG. 8(b) is a graph illustrating an engine feedback control for a cool cylinder in accordance with a second embodiment of the present invention.

A feedback control strategy in accordance with a second embodiment of the present invention is illustrated in FIGS. 8(a) and (b). In accordance with this embodiment, when the engine is indicated as being hot, the ECU 78 causes a correction in the air to fuel ratio of the charge supplied to all cylinders to be made, the correction amount ΔQ being the same for all cylinders, but smaller than a normal compensation value.

In accordance with this embodiment, the correction amount ΔQ is made small enough that when applied to the cooler cylinders, the resultant air to fuel ratio is not so lean that the cylinder operates in the disabling region.

Figure 9A:
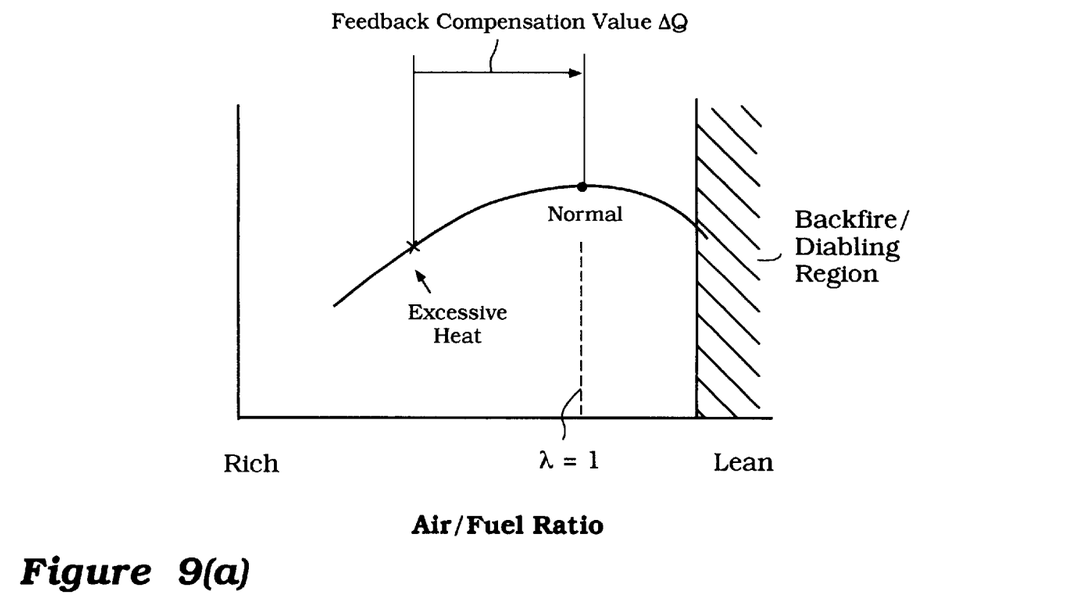
FIG. 9(a) is a graph illustrating an engine feedback control for a hot cylinder in accordance with a third embodiment of the present invention.
Figure 9B:
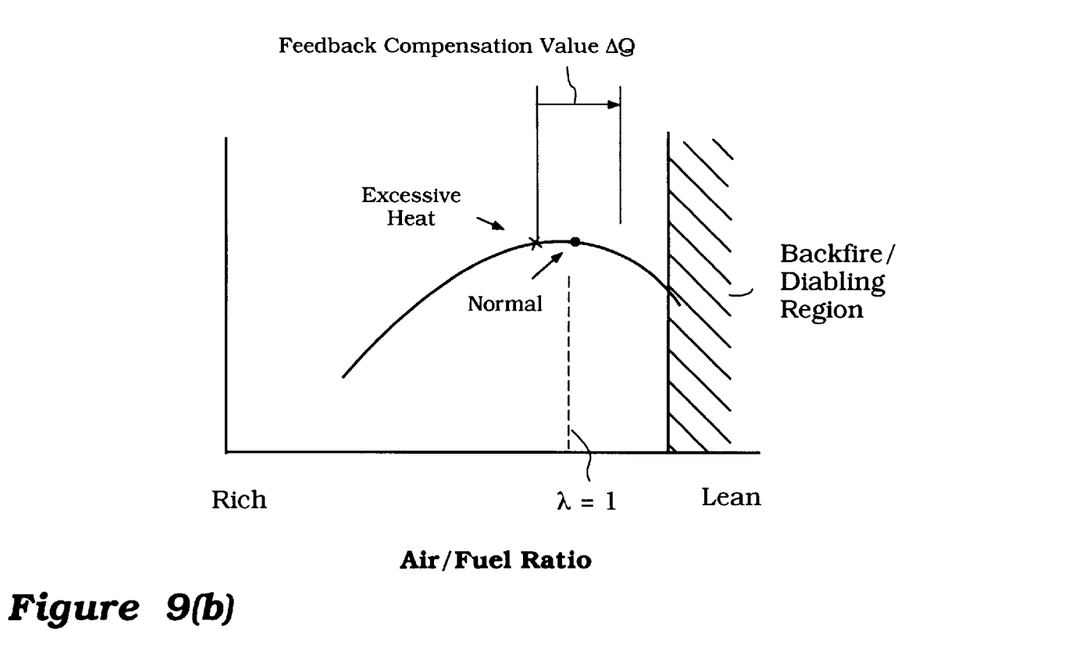
FIG. 9(b) is a graph illustrating an engine feedback control for a cool cylinder in accordance with a third embodiment of the present invention.

An engine feedback control strategy in accordance with a third embodiment of the present invention is illustrated in FIGS. 9(a) and (b). In accordance with this embodiment, a feed back control is employed in which the correction values ΔQ for the hotter and cooler cylinders is pre-arranged to be different. Thus, the ECU 78 is pre-programmed to cause a large correction factor ΔQ to be applied to the hot cylinder(s) and a smaller correction factor ΔQ to be applied to the cooler cylinder(s). In this manner, an appropriate adjustment is made to the hot and cool cylinders, without the adjustment to the cool cylinder(s) being small enough to prevent its operating in the disabling range.

Figure 10A:
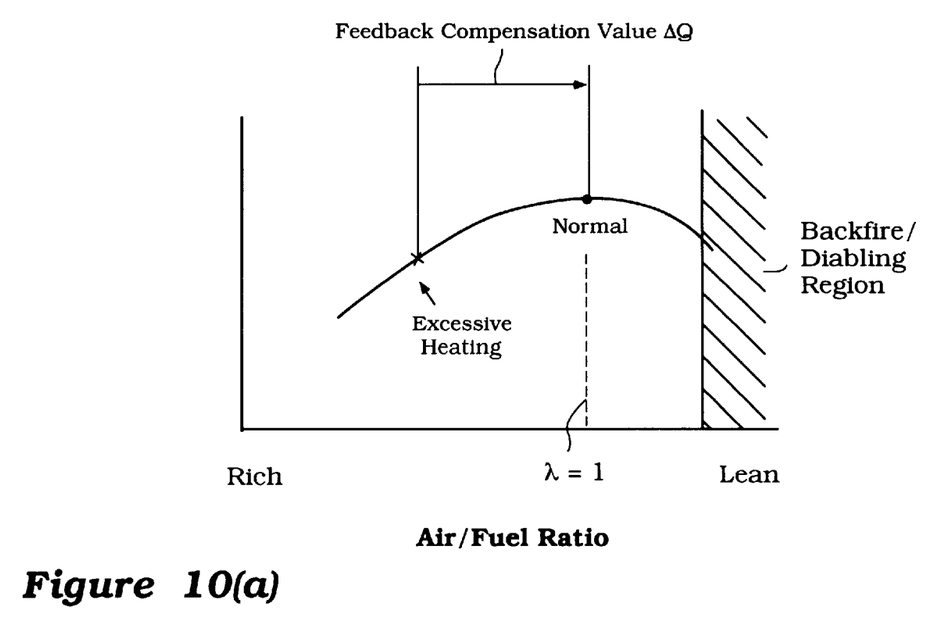
FIG. 10(a) is a graph illustrating an engine feedback control for a hot cylinder in accordance with a fourth embodiment of the present invention.
Figure 10B:
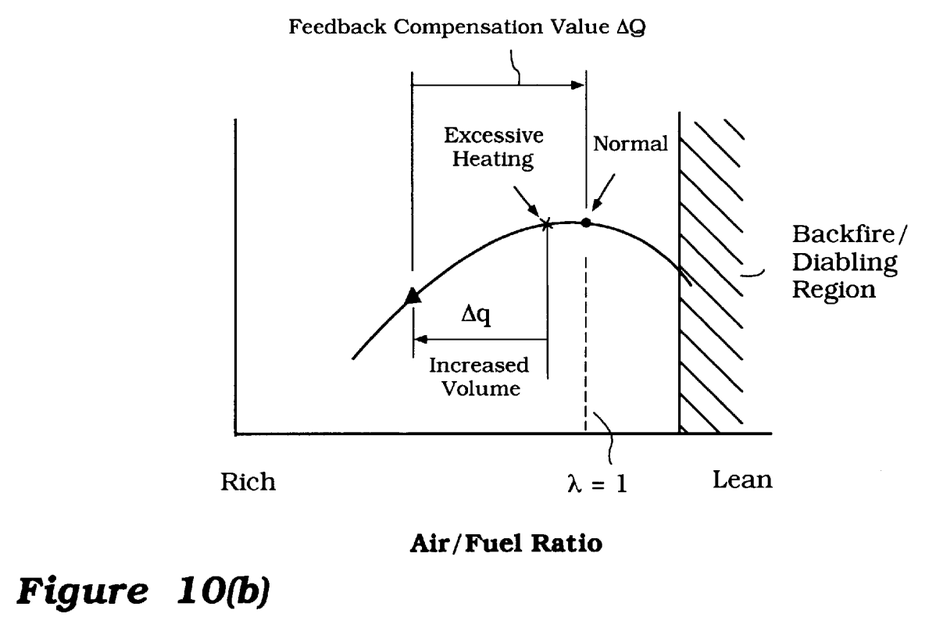
FIG. 10(b) is a graph illustrating an engine feedback control for a cool cylinder in accordance with a fourth embodiment of the present invention.

An engine feedback control strategy in accordance with a fourth embodiment of the present invention is illustrated in FIGS. 10(a) and (b). In this embodiment, the normal compensation ΔQ is made to all cylinders. In addition, however, a volume of fuel Δq is added to the cooler cylinder(s) so that the resultant air to fuel ratio after adjustment remains outside of the disabling range. In conjunction with this embodiment, it is noted that the correction value ΔQ is preferably a multiplier value which causes the air to fuel ratio detected of the hotter cylinder to reach the desired value. This causes the correction value to be larger than necessary for the cylinders which are cooler. In this instance, the value Δq is preferably added value, and not a multiplier.

Figure 11A:
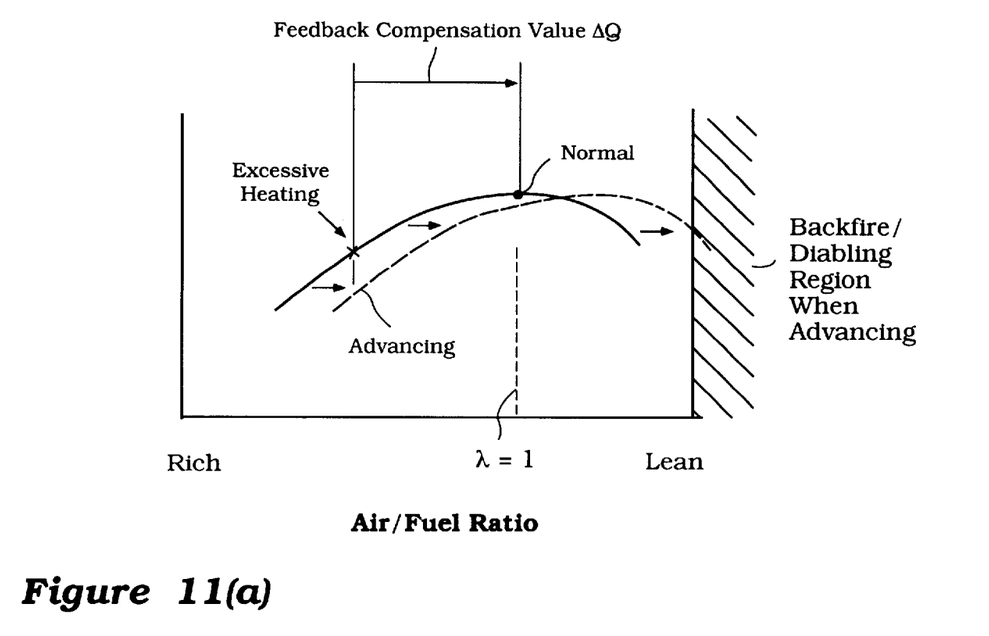
FIG. 11(a) is a graph illustrating an engine feedback control for a hot cylinder in accordance with a fifth embodiment of the present invention.
Figure 11B:
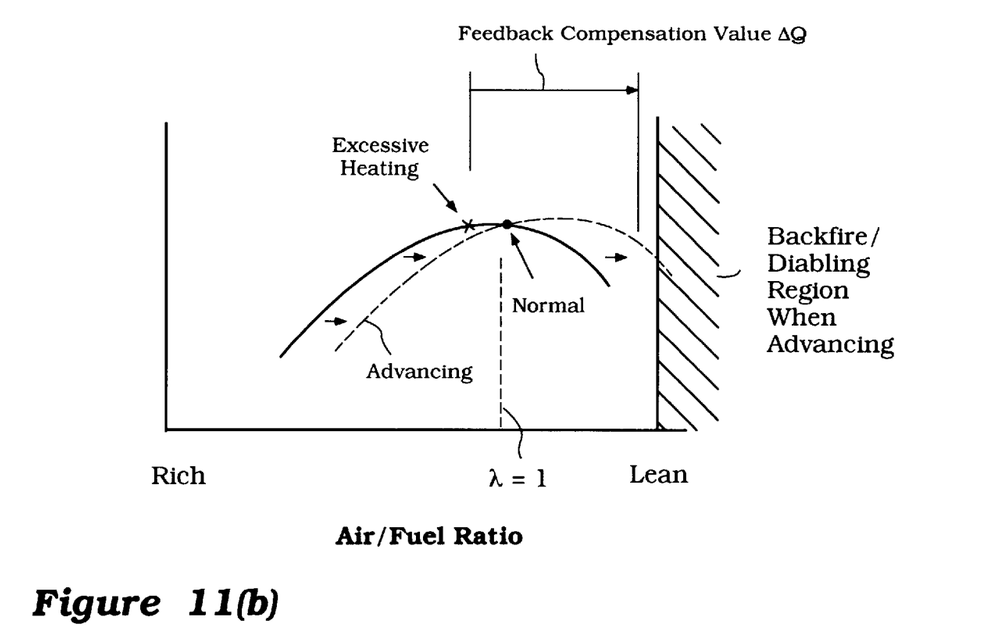
FIG. 11(b) is a graph illustrating an engine feedback control for a cool cylinder in accordance with a fifth embodiment of the present invention.

An engine feedback control strategy in accordance with a fourth embodiment of the present invention is illustrated in FIGS. 11(a) and (b). In accordance with this embodiment, when a high engine temperature is detected, the ECU 78 causes a correction value ΔQ in the air to fuel ratio to be applied to the charge applied to each cylinder. At the same time, however, the ECU 78 effectuates an advance in the spark timing.

As illustrated, the advance in spark timing allows for a longer burn time, creating an apparent increase in the air to fuel ratio for each cylinder, such that even with the standard correction ΔQ, the cooler cylinders do not operate in the disabling region.

Figure 12A:
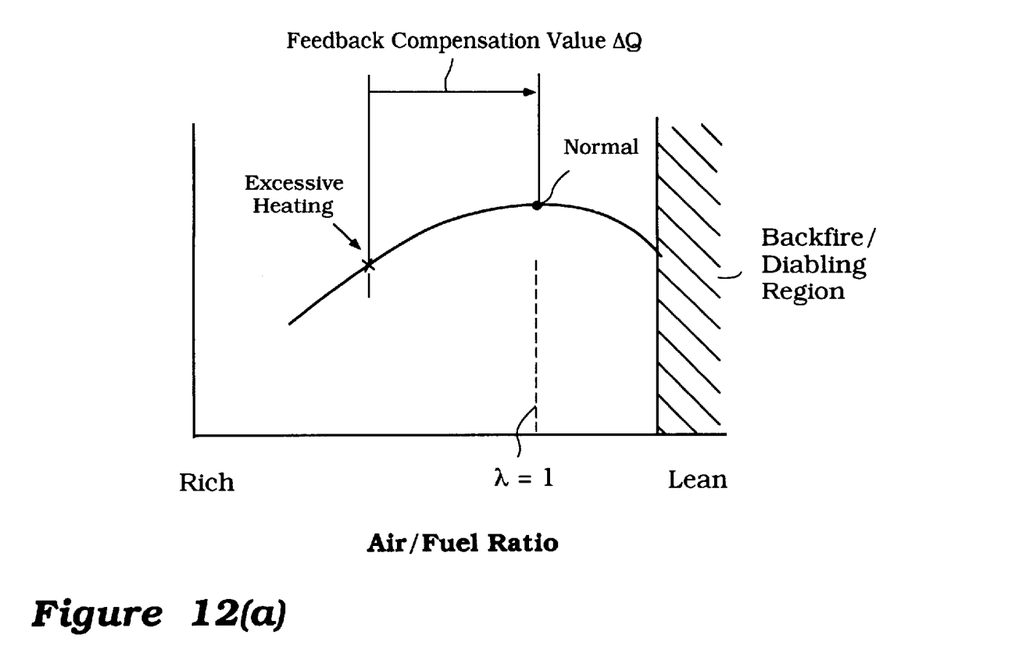
FIG. 12(a) is a graph illustrating an engine feedback control for a hot cylinder in accordance with a sixth embodiment of the present invention.
Figure 12B:
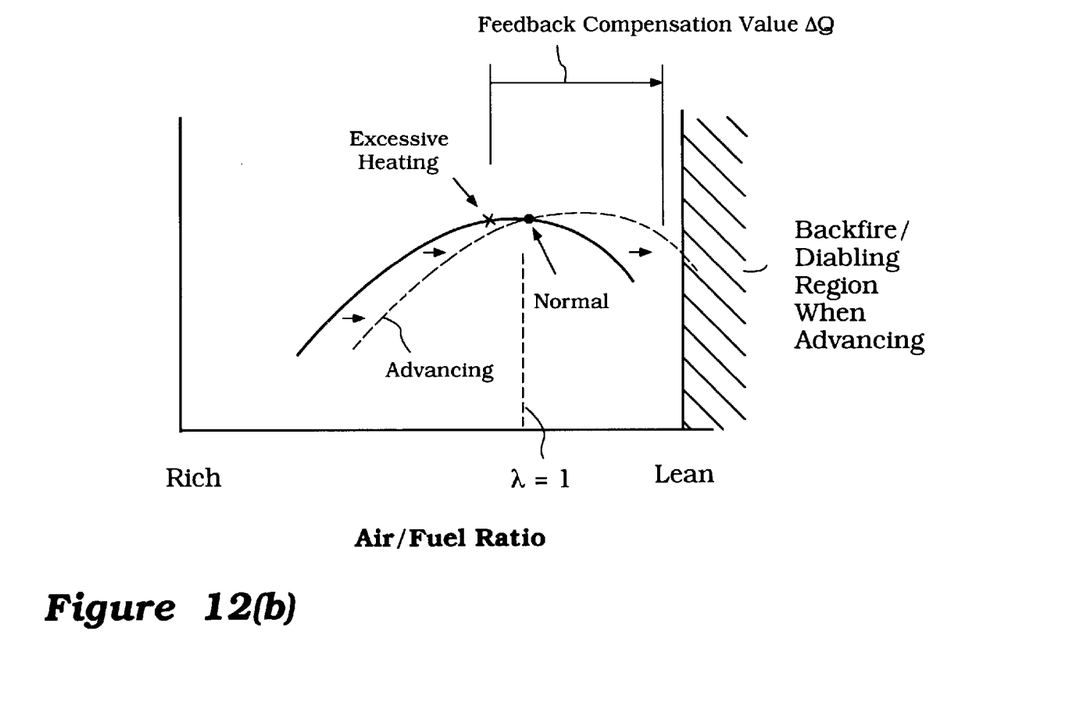
FIG. 12(b) is a graph illustrating an engine feedback control for a cool cylinder in accordance with a sixth embodiment of the present invention.

An engine feedback control strategy in accordance with a fourth embodiment of the present invention is illustrated in FIGS. 12(a) and (b). This embodiment is generally similar to that of the third embodiment described above and illustrated in FIGS. 11(a) and (b), except that a spark advance is applied to only the cooler cylinder(s).

Figure 13A:
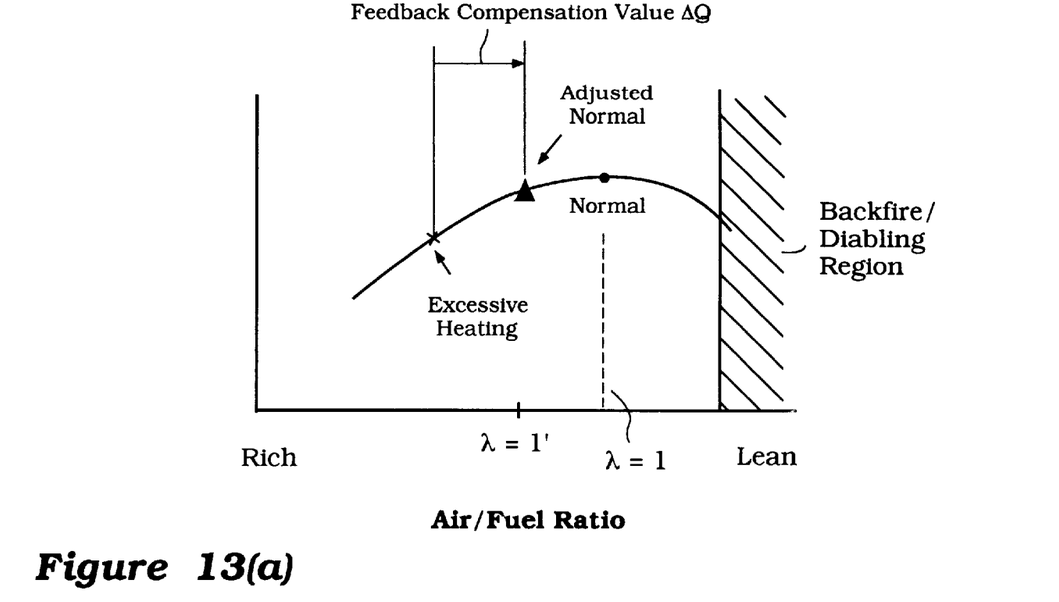
FIG. 13(a) is a graph illustrating an engine feedback control for a hot cylinder in accordance with a seventh embodiment of the present invention.
Figure 13B:
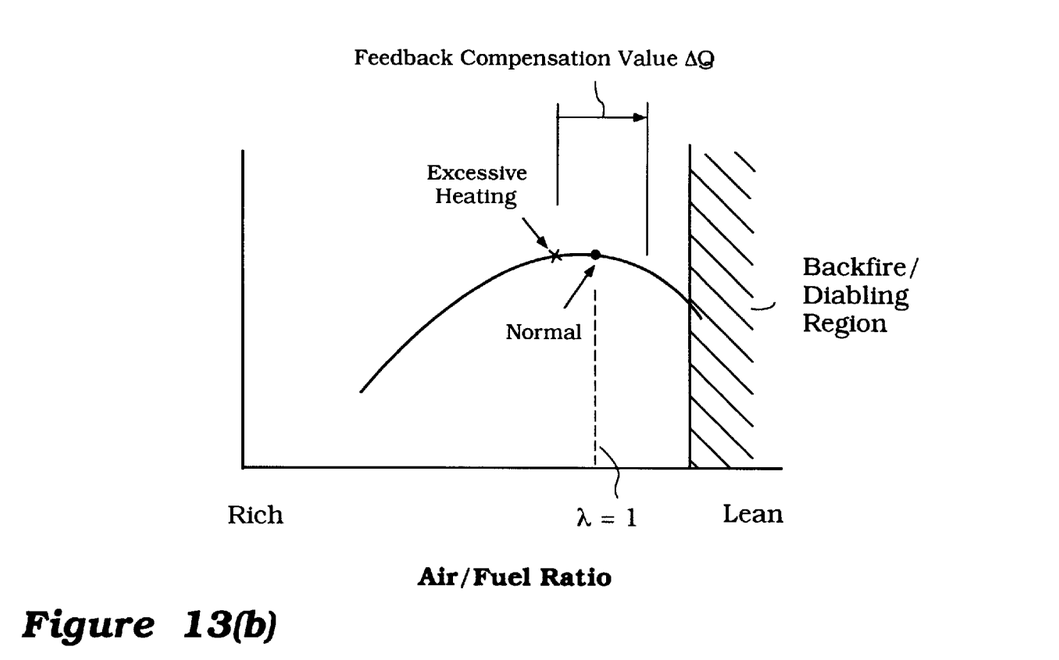
FIG. 13(b) is a graph illustrating an engine feedback control for a cool cylinder in accordance with a seventh embodiment of the present invention.

An engine feedback control strategy in accordance with a fourth embodiment of the present invention is illustrated in FIGS. 13(a) and (b). In accordance with this embodiment of the present invention, when a high engine temperature is detected, the ECU 78 operates in a feedback control mode with a value λ' being the desired air to fuel ratio, as compared to the standard value λ.

Figure 3:
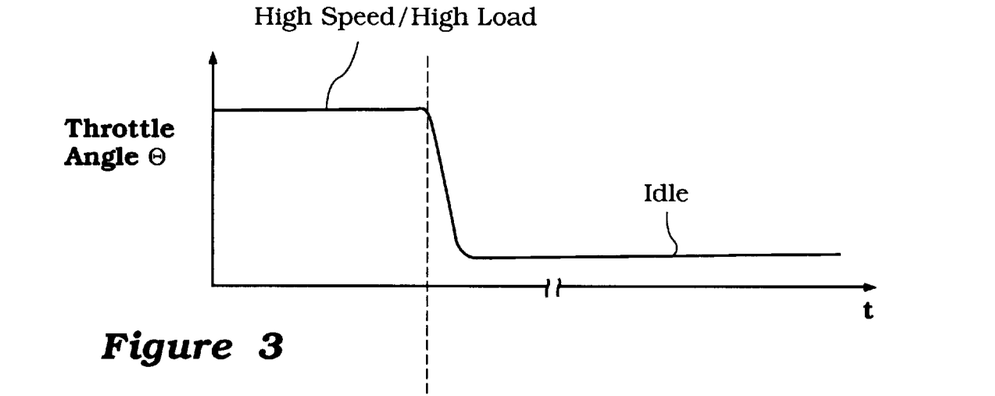
FIG. 3 is a graph illustrating the throttle angle opening when the engine is operating at high speed as compared to idle.
Figure 4:
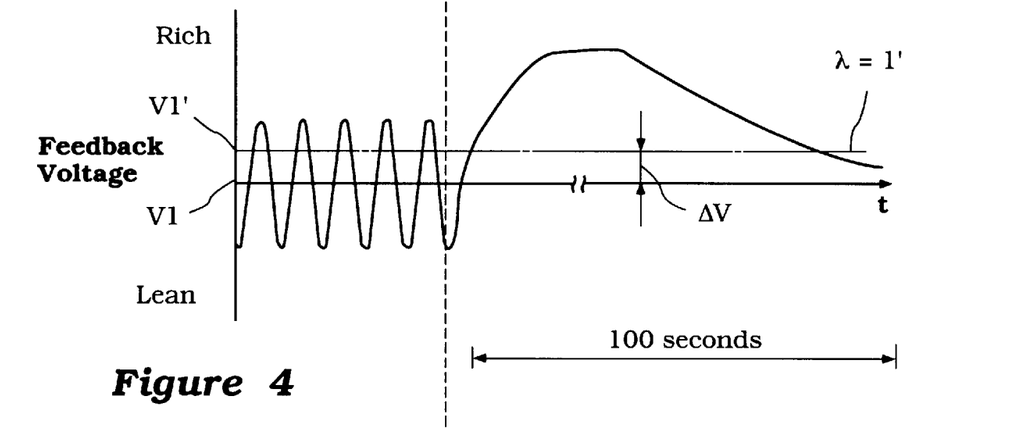
FIG. 4 is a graph illustrating the feedback or control voltage supplied to a fuel injector for causing fuel to be supplied to the engine over time.

As illustrated in FIG. 3, when the engine is operating normally (not at a high temperature) then the ECU 78 causes a feedback voltage V1 to be outputted to the fuel injectors 62. The feedback voltage V1 is generally varied so as to keep the air to fuel ratio as close as possible to stoichiometric (λ=1).

In accordance with this embodiment, once the high heat condition is detected, a new desired air to fuel ratio value λ' is adopted. This value λ' is higher (i.e. corresponding to a richer mixture) than that of normal. Thus, the difference between the actual air to fuel ratio of the hot cylinder(s) is much closer to the new desired value, and a smaller correction value ΔQ may be employed. This value ΔQ is smaller than normal, and small enough that the reduction in the air to fuel ratio does not cause the cooler cylinder(s) to operate in the disabling region.

Of course, the foregoing description is that of preferred embodiments of the invention, and various changes and modifications may be made without departing from the spirit and scope of the invention, as defined by the appended claims.

What is claimed is:

1. An engine feedback control for an internal combustion engine, said engine having a body defining at least two combustion chambers, an intake for providing air to said combustion chambers, a fuel delivery system for providing fuel to said combustion chambers and an exhaust passage leading from said combustion chambers for routing exhaust gasses therefrom, said engine feedback control comprising means for detecting a high engine temperature condition of said engine, means for detecting an air/fuel ratio corresponding to at least one combustion chamber, and means for adjusting the ratio of air and fuel supplied to each combustion chamber towards a desired value with a difference in the amount of fuel supplied to a hotter combustion chamber and a cooler combustion chamber such that operation in a disabling range is prevented.

2. The engine feedback control in accordance with claim 1, wherein said means for adjusting comprises means for adjusting the amount of fuel supplied to each combustion chamber.

3. The engine feedback control in accordance with claim 2, wherein said means for adjusting adjusts the amount of fuel supplied to each combustion chamber independently.

4. The engine feedback control in accordance with claim 1, wherein said means for adjusting reduces the amount of fuel to each combustion chamber.

5. The engine feedback control in accordance with claim 1, wherein said means for adjusting further includes means for changing a spark ignition timing.

6. The engine feedback control in accordance with claim 5, wherein said means for adjusting advances a spark ignition corresponding to at least one combustion chamber.

7. An engine feedback control for an internal combustion engine, said engine having a body defining at least two combustion chambers, an intake for providing air to said combustion chambers, a fuel delivery system for providing fuel to said combustion chambers and an exhaust passage leading from said combustion chambers for routing exhaust gasses therefrom, said engine feedback control comprising means for detecting a high engine temperature condition of said engine, means for detecting an air/fuel ratio corresponding to at least one combustion chamber, and means for adjusting the ratio of air and fuel supplied to each combustion chamber towards a preset, desired value, said means for adjusting changing the preset, desired air to fuel ratio before making an adjustment from the instantaneous air to fuel ratio towards said desired air to fuel ratio when a high temperature condition is detected such that operation in a disabling range is prevented.

8. The engine feedback control in accordance with claim 7, wherein said desired value is changed in the direction of a detected air to fuel ratio.

9. An internal combustion engine having at least two combustion chambers, an intake system for supplying air to each combustion chamber, a fuel supply system for supplying fuel to each combustion chamber, a cooling system for cooling said engine, a temperature sensor for detecting a temperature of said engine, a sensor for detecting a rich air/fuel mixture corresponding to at least one of said combustion chambers, and feedback means for adjusting the air/fuel ratio in the lean direction when a high engine temperature is detected by said temperature sensor such that operation in a disabling range is prevented.

10. The internal combustion engine in accordance with claim 9, wherein said feedback means causes an adjustment in the lean direction corresponding to a hot combustion chamber which is greater than an adjustment corresponding to a cooler combustion chamber.

11. The internal combustion engine in accordance with claim 9, wherein said feedback means causes an adjustment in the lean direction which is equal for all combustion chambers.

12. The internal combustion engine in accordance with claim 9, further including means for advancing a spark timing of a spark element corresponding to at least one combustion chamber in conjunction with said means for adjusting.

13. The internal combustion engine in accordance with claim 12, wherein said means for adjusting adjusts the air/fuel ratio of each combustion chamber the same, and said means for advancing advances a spark timing corresponding to a cooler combustion chamber.

14. The internal combustion engine in accordance with claim 9, wherein said means for adjusting adjusts said air/fuel ratio corresponding to each combustion chamber differently.

15. The internal combustion engine in accordance with claim 9, wherein said feedback means preferably includes means for changing a desired air/fuel ratio in the rich direction before adjusting said air/fuel ratio.

* * * * *